United States Patent
Lederman et al.

(10) Patent No.: US 6,894,983 B1
(45) Date of Patent: May 17, 2005

(54) AUTOMATIC IMPLEMENTATION OF NETWORK CONFIGURATION CHANGES

(75) Inventors: Yaron Lederman, Ramat-Gan (IL); Galit Volpert, Petach-Tikva (IL)

(73) Assignee: Orckit Communicatioins Ltd., Tel Aviv (IL)

(*) Notice: Subject to any disclaimer, the term of this patent is extended or adjusted under 35 U.S.C. 154(b) by 857 days.

(21) Appl. No.: 09/637,300

(22) Filed: Aug. 11, 2000

(51) Int. Cl.⁷ .................. H04L 12/26; H04L 12/28; G06F 15/173

(52) U.S. Cl. .............. 370/252; 370/254; 370/395.1; 709/223

(58) Field of Search .............. 370/351–356, 370/252, 401–402, 463–465, 257, 254, 395.1, 397, 399; 709/223–230, 221; 379/90.01, 93.01

(56) References Cited

U.S. PATENT DOCUMENTS

| | | | | |
|---|---|---|---|---|
| 5,889,470 A | * | 3/1999 | Kaycee et al. | 370/465 |
| 6,058,445 A | * | 5/2000 | Chari et al. | 7009/223 |
| 6,085,245 A | * | 7/2000 | Kaycee et al. | 709/223 |
| 6,181,715 B1 | | 1/2001 | Phillips et al. | |
| 6,219,354 B1 | | 4/2001 | Fink et al. | |
| 6,310,862 B1 | | 10/2001 | Roy | |
| 6,339,594 B1 | | 1/2002 | Civanlar et al. | |
| 6,404,861 B1 | * | 6/2002 | Cohen et al. | 379/93.01 |
| 6,424,657 B1 | | 7/2002 | Voit et al. | |
| 6,434,221 B1 | | 8/2002 | Chong | |
| 6,469,630 B1 | | 10/2002 | Jeske | |
| 6,512,739 B1 | | 1/2003 | Heidari | |
| 6,522,688 B1 | | 2/2003 | Dowling | |
| 6,580,727 B1 | * | 6/2003 | Yim et al. | 370/463 |
| 6,597,689 B1 | | 7/2003 | Chiu | |
| 6,628,649 B1 | | 9/2003 | Raj et al. | |
| 6,636,505 B1 | * | 10/2003 | Wang et al. | 370/254 |
| 6,680,904 B1 | | 1/2004 | Kaplan et al. | |

OTHER PUBLICATIONS

"Integrated Local Management Interface (ILMI) Specification", Version 4.0, ATM Forum Technical Committee (Publication No. af–ilmi–0065.00, Sep. 1996).

Request for Comments (RFC) 1157 of the Internet Engineering TaskForce (IETF), pp. 1–29, (web address: http://www.ietf.org/rfc/rfc1157.txt?number=1157).

* cited by examiner

*Primary Examiner*—Steven Nguyen
(74) *Attorney, Agent, or Firm*—Darby & Darby

(57) ABSTRACT

A method for network management includes sending a trap message from a network end switch to client premises equipment (CPE) over a network connection therebetween, informing the CPE of a change in a network management information base (MIB) of the end switch. A request from the CPE to the end switch, subsequent to the trap message, to read information from the MIB, and the information is provided from the end switch to the CPE responsive to the request. The change is determined to have been implemented by the CPE based on the request to read the information. There is thus no need for the CPE to poll the processor for further trap messages.

19 Claims, 3 Drawing Sheets

AUTOMATIC IMPLEMENTATION OF NETWORK CONFIGURATION CHANGES

FIELD OF THE INVENTION

The present invention relates generally to communication networks, and specifically to automated management of network connections.

BACKGROUND OF THE INVENTION

In modern networks, such as Asynchronous Transfer Mode (ATM) networks, the elements of the network use a management information base (MIB) to maintain common status and configuration information. The ATM MIB, for example, holds information concerning virtual path connections (VPCs), virtual channel connections (VCCs), registered services, registered ATM network prefixes and addresses, and capabilities available at ATM interfaces. All of the ATM devices in the network, such as switches and end-systems, use the MIB to determine how to conduct their network communications.

In order to set up and maintain the MIB, the different ATM devices must exchange management information regarding status and configuration conditions. A variety of different methods and protocols for this information exchange have been developed. One commonly-used method is provided in the *Integrated Local Management Interface (ILMI) Specification*, Version 4.0, published by the ATM Forum Technical Committee (publication no. af-ilmi-0065.00, September, 1996), which is incorporated herein by reference. ILMI supports bi-directional exchange of ATM interface parameters between a pair of connected ATM interface management entities (IMEs), so that each of the pair of IMEs can access the ATM interface MIB of its counterpart. Each pair typically includes a network-side IME and a user-side IME (although within the network there are also symmetric IME pairs). When a network device, such as a switch, has multiple ATM interfaces, it will likewise have multiple IMEs, one for each interface.

When a change occurs in configuration or status information held by one of the IMEs in a pair, it sends a trap packet to its counterpart in order to report the change. Trap packets are the means specified by the Simple Network Management Protocol (SNMP) for reporting extraordinary events in a network. SNMP is defined in Request for Comments (RFC) 1157 of the Internet Engineering Task Force (IETF), and is used by ILMI in management and control operations across ATM interfaces. Ordinarily, when the counterpart IME receives the trap packet, it reads the pertinent information from the sending IME in order to determine the configuration and status changes that have occurred. Trap packets are sent using the User Datagram Protocol (UDP), which generally provides fast service but does not guarantee reliable delivery. Therefore, each IME periodically polls its counterpart in order to ensure that no traps have been missed.

Digital Subscriber Line (DSL) is a modern technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, and thus enables ATM service to be extended to client premises equipment (CPE) without requiring major investments in new infrastructure. A range of DSL standards have been defined, known generically as "xDSL," wherein the various standards have different data rates and other associated features but share common principles of operation.

DSL subscribers are connected to high-speed core networks through Digital Subscriber Line Access Multiplexer (DSLAM) systems. Because of the high cost of network bandwidth, a single DSLAM is typically designed to serve between 100 and 1000 clients and to concentrate their traffic through one or a few network trunks. (In the context of the present patent application, the inverse of the number of clients served by a multiplexer—between 1:100 and 1:1000 in the case of the typical DSLAM—is referred to as its concentration ratio.) Thus, to accord with the ILMI model described above, the DSLAM must maintain as many as 1000 network-side IMEs in order to serve all of its clients. As network use grows in the future, this figure may grow even higher. Concentration ratios of this magnitude were not envisioned when the ILMI standard was developed. Adherence to the conventional ILMI model under these conditions would require both the DSLAM and the CPE to dedicate an excessive amount of computing power to interface management.

SUMMARY OF THE INVENTION

It is an object of the present invention to provide improved methods and systems for network information management, particularly in the context of ATM interface management.

It is a further object of some aspects of the present invention to provide methods of network interface management that are suited for use in access multiplexing systems that serve large numbers of clients.

In preferred embodiments of the present invention, an access multiplexer, such as a DSLAM, provides access to a high-speed network, such as an ATM network, to a large number of subscribers, each maintaining respective client premises equipment (CPE). The multiplexer notifies the CPE of a change in network configuration or status by sending an appropriate trap packet to the CPE. In response to the trap packet, the CPE reads all of the relevant information in the MIB held by the multiplexer. The CPE then replaces the information in its own MIB accordingly. The multiplexer regards the read request that it receives from the CPE as an acknowledgment of the trap. When the multiplexer fails to receive the read request within a specified time limit, it resends the trap packet or, if necessary, resets its link with the CPE.

Thus, the multiplexer verifies that every trap it sends is actually delivered to the CPE, despite the unreliable protocol used to send the trap packet. Consequently, it is not necessary for the CPE to poll the multiplexer, as in ILMI and other conventional network management models. This approach substantially reduces the computing burden placed on the multiplexer, as well as simplifying the functionality of the CPE, by obviating the need for the CPE to poll the DSLAM and for the DSLAM to handle polling requests by hundreds or thousands of CPEs.

There is therefore provided, in accordance with a preferred embodiment of the present invention, a method for network management, including:

sending a trap message from a network end switch to client premises equipment (CPE) over a network connection therebetween, informing the CPE of a change in a network management information base (MIB) of the end switch;

receiving a request from the CPE to the end switch, subsequent to the trap message, to read information from the MIB;

providing the information from the end switch to the CPE responsive to the request; and determining the change to have been implemented by the CPE based on the request to read the information.

Preferably, the CPE replaces old information recorded in a user MIB of the CFE with the information provided from the end switch, wherein the CPE replaces the old information with the provided information substantially in its entirety, without parsing the information for changes.

Further preferably, receiving the request includes awaiting the request for a predetermined period of time, and sending the trap message includes re-sending the trap message if the request is not received within the predetermined period. Most preferably, re-sending the trap message includes making a predetermined number of attempts to re-send the trap message, and including sending a cold start message from the end switch to the CPE to reset the connection if the request is not received after the predetermined number of attempts have been made.

In a preferred embodiment, the network connection includes an Asynchronous Transfer Mode (ATM) network connection, and sending the trap message includes sending an ATM Integrated Local Management Interface (ILMI) trap message. Typically, the trap message includes a virtual channel/path connection (VCC/VPC) trap. Preferably, the network end switch includes an access multiplexer, and the CPE includes one of a plurality of client equipment installations serviced by the multiplexer. Most preferably, the access multiplexer includes a Digital Subscriber Line Access Multiplexer (DSLAM), wherein the DSLAM is adapted to service at least one hundred of the client equipment installations.

Preferably, sending the trap message includes sending multiple trap messages regarding multiple changes in the MIB, and receiving the request includes receiving multiple read requests from the CPE to read the information from the MIB, each such read request subsequent to a respective one of the trap messages, and determining the change to have been implemented includes verifying, responsive to the requests, that all of the changes have been implemented without the CPE having polled the end switch for further trap messages.

There is also provided, in accordance with a preferred embodiment of the present invention, network access multiplexing apparatus, including:

a plurality of interface connections, linking the apparatus to client premises equipment (CPE) at multiple client premises, so as to provide access via the apparatus to a high-speed network;

a memory, adapted to store a network management information base (MIB); and a management processor, adapted to send a trap message to the CPE over one of the interface connections therebetween informing the CPE of a change in the MIB, to receive a request from the CPE subsequent to the trap message to read information from the MIB, to provide the information to the CPE responsive to the request, and to determine the change to have been implemented by the CPE based on the request to read the information.

There is additionally provided, in accordance with a preferred embodiment of the present invention, client premises equipment (CPE), which is adapted to receive a trap message from a network end switch over a network connection therebetween, informing the CPE of a change in a network management information base (MIB) of the end switch, and responsive to the trap message, to read information from the MIB without polling the end switch for further trap messages.

The present invention will be more fully understood from the following detailed description of the preferred embodiments thereof, taken together with the drawings in which:

DETAILED DESCRIPTION OF A PREFERRED EMBODIMENT

Figure 1:
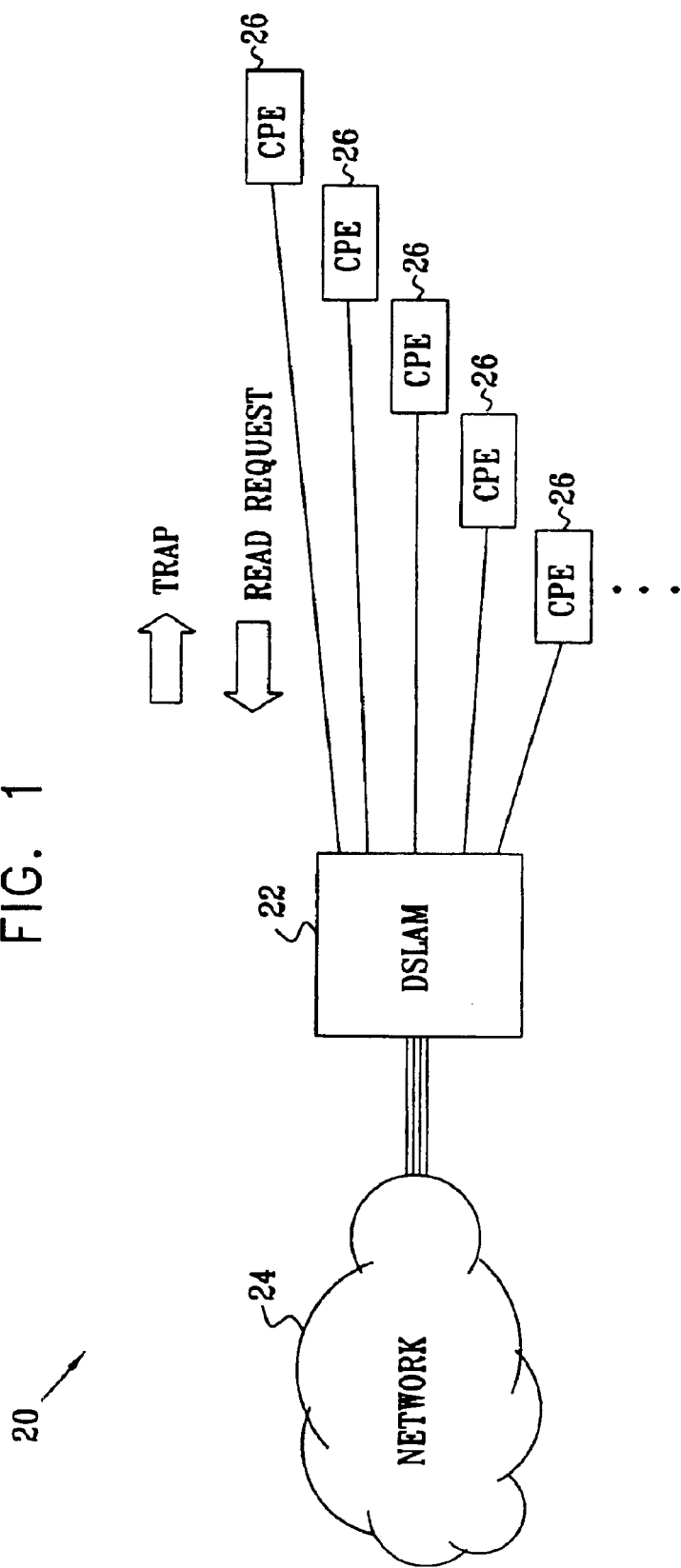
FIG. 1 is a block diagram that schematically illustrates a network access multiplexing system, in accordance with a preferred embodiment of the present invention.

FIG. 1 is a block diagram that schematically illustrates a network access multiplexing system 20, in accordance with a preferred embodiment of the present invention. A DSLAM 22 comprises multiple interface connections, providing access to a network 24 for a plurality of subscribers having respective client premises equipment (CPE) 26. Network 24 preferably comprises an ATM network, and CPE 26 is configured to provide ATM service directly to the subscriber premises.

Figure 2:
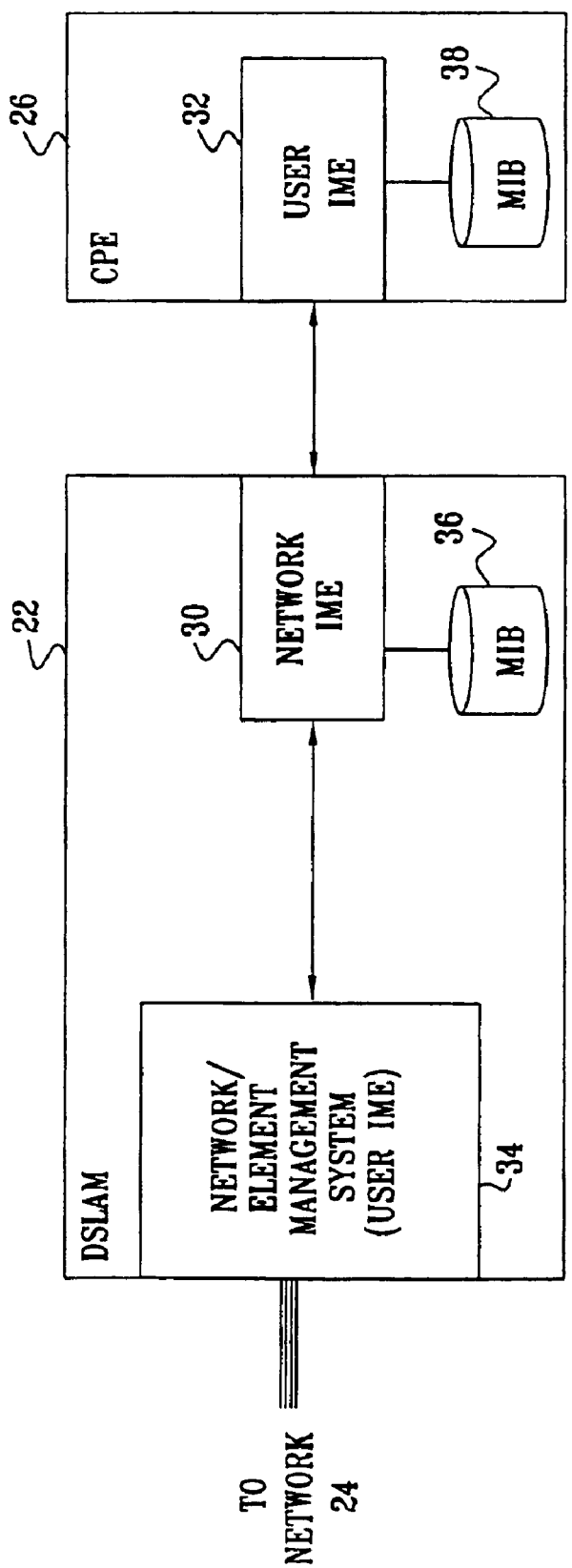
FIG. 2 is a block diagram that schematically illustrates interface management entities in the system of FIG. 1, in accordance with a preferred embodiment of the present invention.

FIG. 2 is a block diagram that schematically shows interface management features of DSLAM 22 and of one of CPEs 26, in accordance with a preferred embodiment of the present invention. In accordance with the ILMI model, the connection between DSLAM 22 and CPE 26 is managed by a pair of IMEs: a network-side IME 30 maintained by the DSLAM, and a user-side IME 32 maintained by the CPE. The IMEs typically comprise central processing units (CPUs) running suitable network management software (frequently in addition to other tasks carried out by the CPUs) IMEs 30 and 32 maintain respective MIBs 36 and 38 in memory associated with the CPUs. The MIBs hold network configuration and status information, including tables of VPCs, VCCs, registered services, etc., as is known in the art. A similar pair of IMEs exists for each of the other CPE-DSLAM connections, so that typically, IME 30 is one of between 100 and 1000 IMEs maintained by the DSLAM. In addition, the DSLAM has a network or element management system 34, which serves as its user-side IME vis-a-vis a network device, such as a core switch, with which the DSLAM communicates over a trunk of ATM network 24.

Figure 3:
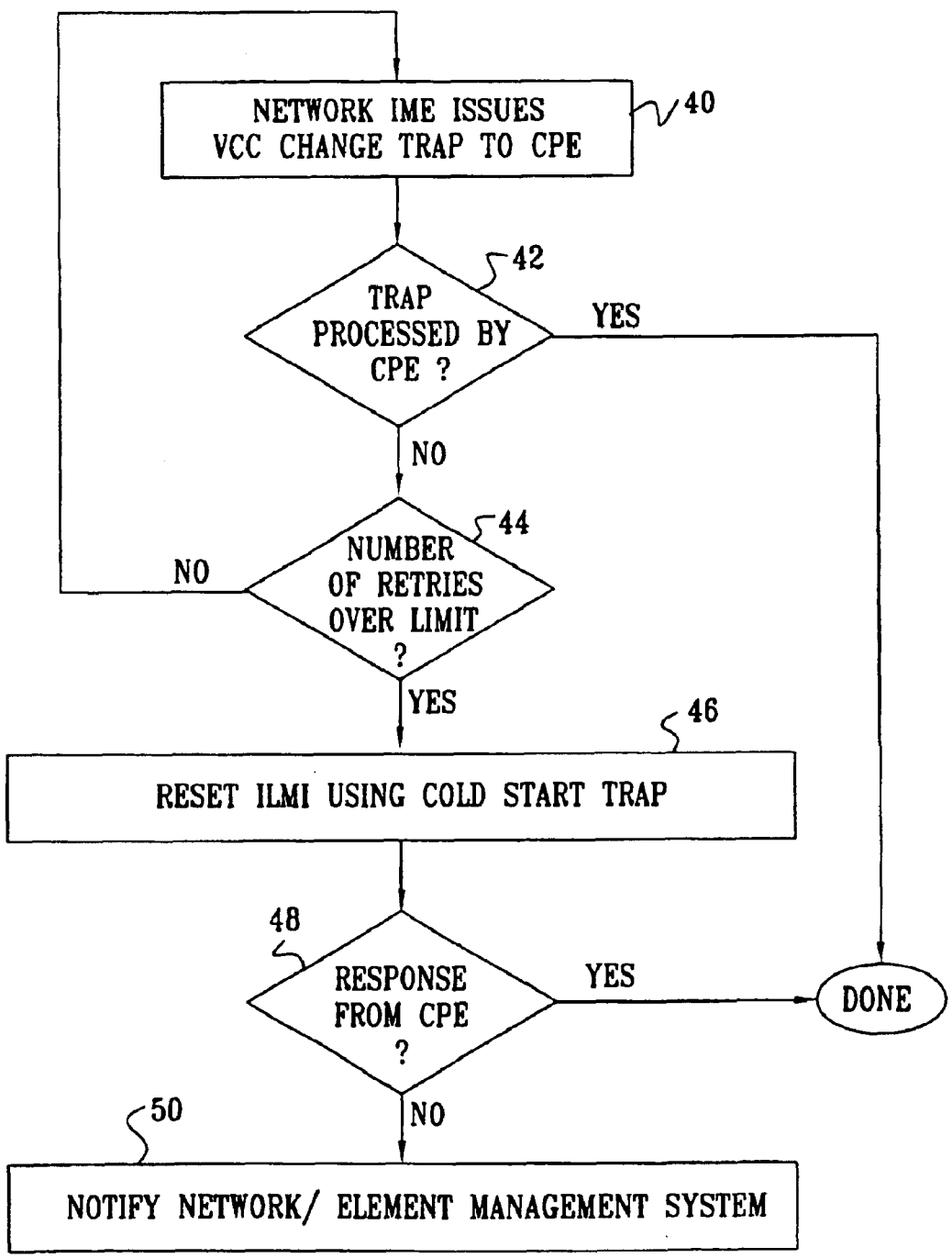
FIG. 3 is a flow chart that schematically illustrates a method for updating network configuration information held by client premises equipment, in accordance with a preferred embodiment of the present invention.

FIG. 3 is a flow chart that schematically illustrates a method by which network IME 30 of DSLAM 22 notifies user IME 32 of CPE 26 of a status or configuration change in MIB 36, in accordance with a preferred embodiment of the present invention. Although this method relates explicitly to VCC changes, it is equally applicable, mutatis mutandis, to VPC changes. IME 30 sends a VCC change trap to IME 32, as defined by the ILMI standard, at a trap issuance step 40. Normally, IME 32 receives the trap, and responds with a request to IME 30 to read the service and VCC tables held in MIB 36. User IME 32 does not poll network IME 30. Rather, it simply reads all information from MIB 36 that is associated with the virtual channel (VC) indicated by the VCC change trap. Upon reading this information, IME 32 clears all of the all of the information regarding this virtual channel (VC) from its own MIB 38, and replaces it with the fresh information read from MIB 36. This approach may be less efficient than methods of configuration updating that are used conventionally, but avoids difficulties that can be caused by having to parse complex changes and thus simplifies the handling of such changes in multi-client environments such as system 20.

When network IME 30 receives the read request from user IME 32, it treats the request as an acknowledgment that IME 32 received the trap packet, at an acknowledgment step 42. Thus, at this point, after IME 32 has read the pertinent information, handling of the status or configuration change by IME 30 is finished.

If at step 42, network IME 30 does not receive a read request from user IME 32 within a specified period of time, it assumes the trap packet to have been lost. Preferably, the specified period is no less than 30 sec. In this case, IME 30 will return to step 40 and send the trap again. This re-send is preferably repeated up to a preset maximum number of attempts, at a retry limit step 44. Most preferably, at least two attempts are made.

When the retry limit is exceeded, network IME 30 sends a cold start trap to user IME 32, as specified by the ILMI standard, at a cold start step 46. The cold start trap resynchronizes the connection between DSLAM 22 and CPE 26. Optionally, IME 30 notifies network/element management system 34 that a cold start has taken place. At this stage, again, network IME 30 waits for an appropriate read request from user IME 32, at a response step 48. When the read request is received, IME 30 assumes the cold start to have been received, acknowledged and implemented by IME 32. MIB 38 of CPE 26 is reset, along with the portion of MIB 36 of DSLAM 22 that relates to this particular CPE, and the process of handling the status or configuration change is done.

If network IME 30 still receives no response to the cold start at step 48, it concludes that CPE 26 is incapable of responding, presumably due to a serious fault. In this case, IME 30 notifies network/element management system 34 of the fault and awaits appropriate service.

Although preferred embodiments are described herein with particular reference to the ILMI specification, the extension of the methods and concepts described herein to other standards for management information exchange will be apparent to those skilled in the art. More generally, while these preferred embodiments relate to ATM networks and DSLAM systems for communication over such networks, the principles of the present invention are similarly applicable to management of other types of networks, such as Internet Protocol (IP) networks. It will thus be appreciated that the preferred embodiment described above is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for network management, comprising:
    sending a trap message from a network end switch to client premises equipment (CPE) over a network connection therebetween, informing the CPE of a change in a network management information base (MIB) of the end switch;
    receiving a request from the CPE to the end switch, subsequent to the trap message, to read information from the MIB;
    providing the information from the end switch to the CPE responsive to the request; and
    determining the change to have been implemented by the CPE based on the request to read the information,
    wherein receiving the request comprises awaiting the request for a predetermined period of time, and wherein sending the trap message comprises re-sending the trap message if the request is not received within the predetermined period, and
    wherein re-sending the trap message comprises making a predetermined number of attempts to re-send the trap message, and comprising sending a cold start message from the end switch to the CPE to reset the connection if the request is not received after the predetermined number of attempts have been made.

2. A method according to claim 1, wherein the CPE replaces old information recorded in a user MIB of the CPE with the information provided from the end switch.

3. A method according to claim 2, wherein the CPE replaces the old information with the provided information substantially in its entirety, without parsing the information for changes.

4. A method according to claim 1, wherein the network connection comprises an Asynchronous Transfer Mode (ATM) network connection.

5. A method according to claim 4, wherein sending the trap message comprises sending an ATM Integrated Local Management Interface (ILMI) trap message.

6. A method according to claim 5, wherein the trap message comprises a virtual channel connection (VCC) trap.

7. A method according to claim 5, wherein the trap message comprises a virtual path connection (VPC) trap.

8. A method according to claim 4, wherein the network end switch comprises an access multiplexer, and wherein the CPE comprises one of a plurality of client equipment installations serviced by the multiplexer.

9. A method according to claim 8, wherein the access multiplexer comprises a Digital Subscriber Line Access Multiplexer (DSLAM).

10. A method according to claim 9, wherein the DSLAM is adapted to service at least one hundred of the client equipment installations.

11. A method according to claim 1, wherein sending the trap message comprises sending multiple trap messages regarding multiple changes in the MIB, and wherein receiving the request comprises receiving multiple read requests from the CPE to read the information from the MIB, each such read request subsequent to a respective one of the trap messages, and
    wherein determining the change to have been implemented comprises verifying, responsive to the requests, that all of the changes have been implemented without the CPE having polled the end switch for further trap messages.

12. Network access multiplexing apparatus, comprising:
    a plurality of interface connections, linking the apparatus to client premises equipment (CPE) at multiple client premises, so as to provide access via the apparatus to a high-speed network;
    a memory, adapted to store a network management information base (MIB); and a management processor, adapted to send a trap message to the CPE over one of the interface connections therebetween informing the CPE of a change in the MIB, to receive a request from the CPE subsequent to the trap message to read information from the MIB, to provide the information to the CPE responsive to the request, and to determine the change to have been implemented by the CPE based on the request to read the information, wherein the processor is adapted to await the request for a predetermined period of time, and to re-send the trap message if the request is not received within the predetermined period, and wherein the processor is adapted to re-send the trap message a predetermined number of times, and to send a cold start message to the CPE to reset the connection therebetween if the request is not received after the trap message has been re-sent the predetermined number of times.

13. Apparatus according to claim 12, wherein the interface connections comprise Asynchronous Transfer Mode (ATM) network connections.

14. Apparatus according to claim 13, wherein the trap message comprises an ATM Integrated Local Management Interface (ILMI) trap message.

15. Apparatus according to claim 14, wherein the trap message comprises a virtual channel connection (VCC) trap.

16. Apparatus according to claim 14, wherein the trap message comprises a virtual path connection (VPC) trap.

17. Apparatus according to claim 12, wherein the interface connections comprise Digital Subscriber Line (DSL) connections, and wherein the apparatus comprises a Digital Subscriber Line Access Multiplexer (DSLAM).

18. Apparatus according to claim 17, wherein the DSLAM is adapted to service at least one hundred of the client equipment installations.

19. Apparatus according to claim 12, wherein the trap message comprises multiple trap messages, and wherein the request comprises multiple requests from the CPE to read the information from the MIB, each such request subsequent to a respective one of the trap messages, and wherein the management processor is adapted to verify, responsive to the read requests, that all of the changes have been implemented, without the CPE having polled the processor for further trap messages.

* * * * *

UNITED STATES PATENT AND TRADEMARK OFFICE
CERTIFICATE OF CORRECTION

PATENT NO. : 6,894,983 B1
DATED : May 17, 2005
INVENTOR(S) : Yaron Lederman et al.

It is certified that error appears in the above-identified patent and that said Letters Patent is hereby corrected as shown below:

<u>Title page,</u>
Item [73], Assignee, please delete "Orckit Communicatioins Ltd., Tel Aviv (IL)" and substitute -- Orckit Communications Ltd., Tel Aviv (IL) --.

Signed and Sealed this

Sixth Day of September, 2005

JON W. DUDAS
*Director of the United States Patent and Trademark Office*